US012708959B2

(12) United States Patent
Gerhards et al.

(10) Patent No.: US 12,708,959 B2
(45) Date of Patent: Aug. 18, 2026

(54) METHOD FOR WELDING USING A MOBILE VACUUM CHAMBER

(71) Applicant: Fachhochschule Aachen, Aachen (DE)

(72) Inventors: Benjamin Gerhards, Aachen (DE); Markus Schleser, Langerwehe (DE); Stefan Libert, Aachen (DE)

(73) Assignee: FACHHOCHSCHULE AACHEN, Aachen (DE)

( * ) Notice: Subject to any disclaimer, the term of this patent is extended or adjusted under 35 U.S.C. 154(b) by 478 days.

(21) Appl. No.: 18/277,439

(22) PCT Filed: Jan. 18, 2022

(86) PCT No.: PCT/EP2022/050979
§ 371 (c)(1),
(2) Date: Aug. 16, 2023

(87) PCT Pub. No.: WO2022/179767
PCT Pub. Date: Sep. 1, 2022

(65) Prior Publication Data

US 2024/0123547 A1 Apr. 18, 2024

(30) Foreign Application Priority Data

Feb. 25, 2021 (DE) ..................... 10 2021 104 512.6

(51) Int. Cl.
*B23K 26/12* (2014.01)
*B23K 26/26* (2014.01)

(52) U.S. Cl.
CPC ........ *B23K 26/1224* (2015.10); *B23K 26/127* (2013.01); *B23K 26/26* (2013.01)

(58) Field of Classification Search
None
See application file for complete search history.

(56) References Cited

U.S. PATENT DOCUMENTS 3,222,496 A * 12/1965 Windebank ............ B23K 15/06 219/121.21
3,731,052 A * 5/1973 Ogawa .................... H01J 37/18 219/121.13

(Continued)

FOREIGN PATENT DOCUMENTS

CN 108644298 A 10/2018
DE 2 152 100 10/1971

(Continued)

OTHER PUBLICATIONS

Reisgen Uwe et al., "Laser beam welding in mobile vacuum", WLT, Lasers in Manufacturing Conference 2017, pp. 1-10.

(Continued)

*Primary Examiner* — Thor S Campbell
(74) *Attorney, Agent, or Firm* — Norris McLaughlin, P.A.

(57) ABSTRACT

Two parts are joined along a joining gap disposed therebetween by welding by illuminating the joining gap with an energy beam through a mobile vacuum chamber which is moved, on the side to be welded, on the parts being joined along the joining gap and in which a vacuum is generated. The vacuum chamber forms a first vacuum chamber in which, during welding, a vacuum having a first pressure level is generated, and a vacuum having a second pressure level is generated in a second vacuum chamber which adjoins the first vacuum chamber directly at a chamber wall thereof and which, during welding, regionally covers the joining gap. The pressure levels in the two vacuum chambers are matched to one another or the first pressure level is raised to above the second pressure level by way of a pressure regulating system.

10 Claims, 2 Drawing Sheets

(56) References Cited

U.S. PATENT DOCUMENTS

Figure 1:
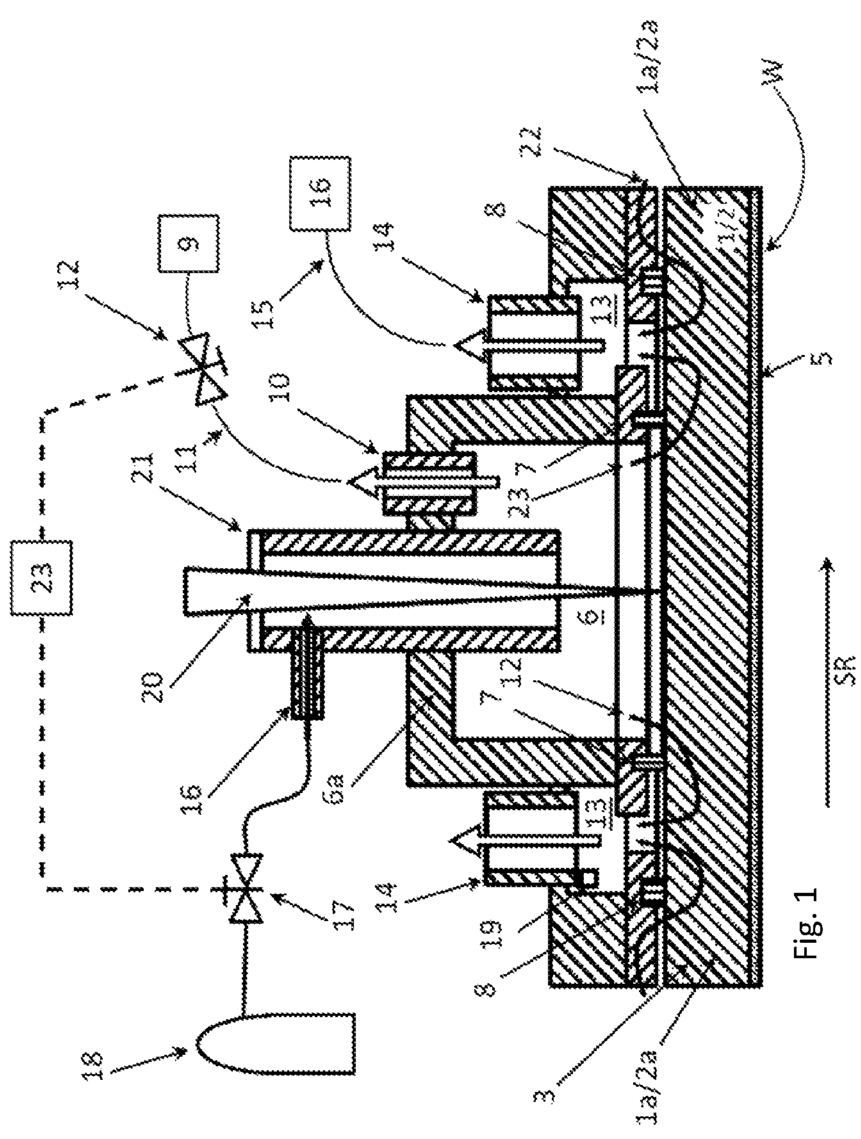

| | | | | |
|---|---|---|---|---|
| 3,742,365 A * | 6/1973 | Sciaky | B23K 15/06 | |
| | | | 219/121.13 | |
| 4,093,843 A * | 6/1978 | Lindstrom | B23K 15/06 | |
| | | | 219/121.13 | |
| 4,205,216 A * | 5/1980 | Douglas | B23K 26/0823 | |
| | | | 198/950 | |
| 10,071,437 B2 * | 9/2018 | Stecker | B23K 26/346 | |
| 10,189,114 B2 * | 1/2019 | Stecker | B22F 10/25 | |
| 2018/0071667 A1 * | 3/2018 | Baniassadi | B01D 35/16 | |
| 2018/0085854 A1 | 3/2018 | Fissette et al. | | |
| 2024/0123547 A1 * | 4/2024 | Gerhards | B23K 26/26 | |

FOREIGN PATENT DOCUMENTS

| | | | |
|---|---|---|---|
| DE | 10 2014 103 635 B4 | 4/2017 | |
| DE | 10 2014 103 635 C5 | 12/2019 | |
| DE | 102018009356 A1 | 6/2020 | |
| DE | 10 2019 107 887 A1 | 10/2020 | |
| DE | 102024107627 A1 * | 9/2025 | B23K 26/0869 |
| EP | 1106828 A2 * | 6/2001 | F04B 27/0878 |
| GB | 2499594 A * | 8/2013 | B23K 26/0838 |
| GB | 2499594 B | 8/2013 | |
| GB | 2568696 A * | 5/2019 | B23K 26/1224 |
| JP | 62-168693 A | 7/1987 | |
| JP | 2001220920 A | 8/2001 | |

OTHER PUBLICATIONS

Meng Jiang et al., “Laser Welding under Vacuum: A Review”, Applied Sciences, 2017, 7, 909, pp. 2-17.

Ebflow—Technical Brochure—German.

* cited by examiner

METHOD FOR WELDING USING A MOBILE VACUUM CHAMBER

The invention relates to a method for welding together two parts to be joined along a joining gap disposed therebetween, wherein, for welding, an energy beam illuminates the joining gap, in particular over the entire depth of the joining gap, through a mobile vacuum chamber, which is moved on the parts to be joined along the joining gap, in particular covering the joining gap at least regionally in the process, and in which a local vacuum is generated.

An energy beam shall be understood to mean a beam of electromagnetic radiation or a beam of particles, for example electrons, which is suitable for delivering energy onto the parts to be joined at the impingement site so as to weld the parts to be joined together there. Such an energy beam is preferably a laser beam or an electron beam. A mobile vacuum chamber can be used for such a method, which comprises a chamber housing including a vacuum connection and, having an opening, in the direction of the surface of the parts to be joined to be welded, the opening edge of which can be placed onto the surface of the parts to be joined to be welded in a sealed manner and which has a generation region or a coupling region, located opposite the opening, for an energy beam, for example a laser beam. This coupling region for a laser beam or other electromagnetic beam can preferably comprise a window, for example made of glass or made of another material that allows the beam to pass, but does not allow gas to pass. If the energy beam is a particle beam, this may also be such that energy-carrying particles are generated in a generation region within the vacuum chamber and, in particular, these are accelerated, proceeding therefrom, in the direction of the aforementioned opening.

The vacuum connection is connected via a line to a pump so as to pump air and/or shielding gas out of the vacuum chamber.

Methods and vacuum chambers of this type are known in the prior art, for example from publication DE 10 2019 107 887 A1 by the same applicant. These are used to carry out welding operations on parts to be joined under vacuum conditions. A vacuum, relative to the surrounding area, which is not covered by the vacuum chamber, is generated in the vacuum chamber, so that the welding operation can be carried out under vacuum conditions in the vacuum chamber.

Using this method, it is thus also possible to weld together very large components that do not fit entirely in the vacuum chamber under the action of the vacuum at the welding site, since the local region of the vacuum generation surrounds the welding site and is advanced along the joining gap as welding progresses.

The problem when welding parts to be joined that are very thick by way of a vacuum welding method using a mobile vacuum chamber, and in particular in the case of parts to be joined that are more than 10 mm thick, is that, in one possible embodiment, the opposing end faces of the parts to be joined, between which the joining gap is formed, must be ground with utmost precision so that the parts to be joined bear on one another with a so-called technical zero gap, since only this way can ambient air be sufficiently reliably prevented from being suctioned through the joining gap into the regions under the vacuum chamber.

A technical zero gap is furthermore a prerequisite when no filler metals can be introduced into the vacuum chamber. However, such a zero gap is difficult to produce with very thick parts to be joined, in particular at a thickness of more than 10 mm.

A technical zero gap shall be understood to mean a joining gap between the parts to be joined of less than 25 micrometers. It is evident that adhering to such a condition is a difficult task, especially when the parts to be joined are very thick, in particular due to the tolerances that occur under manufacturing conditions.

The aforementioned publication generally also opens up the possibility of welding without a zero gap using filler metals that are fed through a preferably gas-tight passage into the vacuum chamber, through which the energy beam, and preferably a laser beam, is transmitted. The invention is preferably likewise carried out using a mobile vacuum chamber, into which such filler metals can be fed, but may also be employed without filler metal.

The problem that arises without a zero gap is that large leakage air currents arise through the joining gap, which can be prevented according to the aforementioned publication by sealing the joining gap in a gas-tight manner in all surface regions on a temporary basis prior to welding, with the exception of a starting region, onto which the mobile vacuum chamber is placed and through which the inner volume of the joining gap is evacuated. These preparatory measures likewise prove to be very complex, in particular with respect to the time that is required for the overall welding process.

It is therefore an object of the invention to provide a method for welding, and preferably for laser welding, parts to be joined using a mobile vacuum chamber, which overcomes the aforementioned disadvantages, in particular by way of which comparatively thick parts to be joined can also be welded together without complex preparatory measures on the parts to be joined.

According to the invention, this object is achieved in that the vacuum chamber, through which the energy beam, and preferably a laser beam, is transmitted, forms a first vacuum chamber, in which, during welding, a vacuum having a first pressure level is generated, and a vacuum having a second pressure level is generated in a second vacuum chamber, which adjoins the first vacuum chamber and which, during welding, regionally covers the joining gap, wherein the pressure levels in the two vacuum chambers are matched to one another or the first pressure level is raised to above the second pressure level by way of a pressure regulating system.

Preferably, it may be provided that the second vacuum chamber directly adjoins the chamber wall of the first vacuum chamber, and in particular that the two vacuum chambers have a shared chamber wall.

For example, the second vacuum chamber can be disposed to precede the first vacuum chamber in the welding direction, and in particular can cover the portion of the joining gap located ahead of the first vacuum chamber in the welding direction. The two vacuum chambers are linearly disposed one behind the other.

In a preferably possible embodiment, the second vacuum chamber can surround the first vacuum chamber at least regionally, and preferably completely, in particular as viewed in a plane in or parallel to the plane of the parts to be joined.

For example, the second vacuum chamber can be divided into several, in particular at least two, chamber regions in the circumferential direction around the first vacuum chamber, wherein the chamber regions are connected among one another. Overall, all chamber regions thus form the second vacuum chamber. The connections between the chamber regions, and preferably between respective neighboring chamber regions, can take place by way of lines, which preferably have a cross-section, in particular as viewed in a section transverse to the circumferential direction, that is smaller than the cross-section of the connected chamber regions.

For example, an embodiment is possible in which the second vacuum chamber comprises a first chamber region and a second chamber region, between which the first vacuum chamber is disposed. The first and second chamber regions of the second vacuum chamber are fluidically connected by at least one line and have an at least substantially identical pressure level. The first and second chamber regions are preferably located with the first vacuum chamber on a line one behind the other, and in particular on a line that covers the joining gap. The first and second chamber regions of the second vacuum chamber and the first vacuum chamber are preferably located on this aforementioned line in terms of the respective centers thereof that are located on the surface of the parts to be joined. The two chamber regions can thus preferably surround the first vacuum chamber on diametrically opposed sides.

It may be provided that the first and second chamber regions of the second vacuum chamber are the only chamber regions, or that further chamber regions of this second vacuum chamber are disposed between the first and second chamber regions of the second vacuum chamber.

It may also be provided that the second vacuum chamber completely surrounds the first vacuum chamber, preferably in an at least substantially constant cross-section, in particular as viewed in the plane of the surface of the parts to be joined. In this embodiment, the second vacuum chamber is preferably annular, wherein the annular inside wall of the second vacuum chamber can also form the annular outside wall of the first vacuum chamber.

Regardless of the specific chamber design, the method according to the invention opens up the possibility of either the vacuum being the same in the two vacuum chambers, or the pressure in the second vacuum chamber being lower than in the first vacuum chamber, as a result of being regulated.

Without a pressure differential between the chambers, no gas flow occurs between the vacuum chambers across the joining gap. This generates a particularly stable melt pool.

If, conversely, a pressure differential is present, this is set according to the invention such that the pressure in the first, in particular inner, vacuum chamber in which the welding process is carried out is higher than in the second vacuum chamber. As a result of shielding gas being fed through at least one shielding gas connection into the first vacuum chamber, at the most the shielding gas flowing into the first vacuum chamber can flow from the first vacuum chamber into the second vacuum chamber through the joining gap. In contrast, oxygen-containing ambient air cannot flow from the second vacuum chamber into the first vacuum chamber due to the pressure conditions.

The invention thus ensures that the melt pool created in the first vacuum chamber is always present in a shielding gas atmosphere under vacuum conditions.

Due to the method according to the invention, there is no longer a need to prepare the parts to be joined for the formation of a technical zero gap.

In particular, it is even advantageous to configure a sufficiently large joining gap between the parts to be joined so that the resulting pressure equalization can generate a shielding gas flow in the direction toward the second vacuum chamber through the joining gap, at least when the pressure in the second vacuum chamber is lower than in the first.

It can therefore preferably be provided to design the joining gap larger than a technical zero gap. A required or desired joining gap can be set prior to the start of welding, and the parts to be joined can be fixed, for example by tack-welding to one another.

It is thus preferred that, according to the invention, the joining gap between the parts to be joined is formed by placing the parts to be joined against one another, wherein the distance between the opposing parts to be joined is outside the tolerances of a technical zero gap, and in particular the parts to be joined are disposed in an l-butt joint configuration with non-ground edges with respect to one another. According to the invention, the preparatory measures for generating a technical zero gap can thus be dispensed with.

In particular, the parts to be joined can be placed against one another with the roughness of the surfaces thereof that define the joining gap so as to form a joining gap, which is provided by a conventional method for severing/cutting material, such as water jet cutting, laser beam cutting, plasma cutting, sawing, burning, and the like.

Particularly preferably, it is thus possible to weld together parts to be joined having a thickness of greater than 10 mm, preferably greater than 20 mm, more preferably greater than 30 mm, more preferably greater than 40 mm, more preferably greater than 50 mm, more preferably greater than 60 mm, still more preferably greater than 70 mm, even more preferably greater than 80 mm, preferably greater than 90 mm, and more preferably greater than 100 mm, or even more, with considerably decreased complexity compared to the prior art. Further preferably, this can take place in a single welding operation.

In particular when the pressure is the same in the two vacuum chambers, the welding can also, however, be carried out when the parts to be joined are positioned with a technical zero gap with respect to one another.

The invention can preferably provide that the difference between the pressure levels of the two vacuum chambers is maintained within a predetermined regulating range, in particular within a range of 1 to 30 mbar, and preferably 10 to 20 mbar.

This yields the advantage that, even though the pressure differential results in a shielding gas flow from the first vacuum chamber into the second vacuum chamber, in particular through the still unwelded joining gap region, which precedes the laser beam in the welding direction, the volume of flow is so low that the melt pool is not negatively influenced at the welding site.

The invention can provide here that the regulating system is configured such that, taking system-inherent regulating inaccuracy into consideration, the pressure level in the second vacuum chamber is, at all times, lower than in the first vacuum chamber, or at the most is equal. This can be achieved, for example, by selecting the target value of the pressure differential to be greater than the maximum possible regulating range.

The invention can preferably provide that the first pressure level is changed by technical regulating measures for setting the relative position of the pressure levels with respect to one another as part of the regulation process, in particular as a function of the actual vacuum metrologically acquired in the two vacuum chambers. For the detection of pressure measurement values, the two vacuum chambers can each comprise at least one pressure sensor, the measurement value of which is made available for regulation.

The regulation can be carried out, for example, by changing the volume of flow of the shielding gas fed to the first vacuum chamber and/or by changing the volume of flow of the gas, in particular shielding gas, that is pumped out of the first vacuum chamber. Respective changes can, for example, take place by the activation of at least one valve, which is to say in particular a valve in the at least one shielding gas feed line, which opens into the first vacuum chamber, and/or by the activation of a valve in the pump-out line, via which the first vacuum chamber is connected to a pump pumping out the gas, and in particular the shielding gas.

Particularly advantageously, it may be provided that regulation can be carried out without modifying the pump line by way of which the second vacuum chamber is evacuated. The vacuum in the second vacuum chamber can thus be unregulated itself, for example, in particular even when the pressure varies, for example due to a variation of the joining gap width along the weld path.

However, the option also exists to regulate the vacuum in the second vacuum chamber to a certain target value, and to then modify the pump line, for example by modifying at least one valve cross-section in the pump line and/or the pump capacity.

In general, it may be provided that the target value for regulating the pressure in the first vacuum chamber is directly defined by the actual vacuum in the second vacuum chamber, or the target value is found as a function of the actual vacuum in the second vacuum chamber, for example by the addition of the differential pressure value that is desired to be present between the chambers. As mentioned above, this actual vacuum value in the second vacuum chamber itself may be subject to regulation or be unregulated.

Further preferably, it may be provided that the weld parameters of the energy beam, which is preferably a laser beam or an electron beam, and in particular the beam power, are changed as a function of the first and/or second pressure level, which is to say the pressure in the first and/or second vacuum chamber. It is thus possible to compensate for variations in the joining gap, along the weld path, which affect the particular pressure level.

Furthermore, the weld parameters preferably include the weld speed and/or the beam power and/or the pendulum amplitude and/or frequency and/or the impingement point of a filler wire, which is preferably fed, relative to the beam. This filler wire is preferably selected in such a way that approximately half the wire is immersed into the melt pool, while the other half of the wire is moved directly into the energy beam, preferably laser beam.

Even though the desired pressure differential is adhered by way of regulation, the absolute pressure levels of the two vacuum chambers can vary along the weld path.

In an advantageous refinement of the invention, the joining gap at the root-side surface of the parts to be joined is sealed prior to starting to weld the parts to be joined together. As a result, ambient air can be prevented from reaching the first vacuum chamber in the thickness direction of the parts to be joined through the joining gap.

Still more preferably, prior to starting to weld the parts to be joined together, the joining gap can be sealed in all surface regions of the parts to be joined in which the joining gap is open to the surrounding area, with the exception of the surface regions on the side to be welded.

In the case of butt-joined parts to be joined, in which the joining gap at the joining gap start and end is likewise open at the end-face surfaces, the invention can provide that the joining gap is also sealed at these end-face surfaces. For this purpose, run-on and/or run-off plates disposed, for example, before and/or after the joining gap can be used, which are attached in a sealed manner to the parts to be joined at the end faces, for example likewise by welding.

According to the invention, it may preferably be provided that the sealing of the joining gap with respect to the surrounding area at the root side is locally removed during the welding process, and in particular is replaced by the generated weld seam. Any measures and sealing means can be used for the preferably gas-tight sealing so as to achieve the seal, since the sealing means used for sealing can also evaporate under the action of the energy beam, and preferably of the laser, on the root side. The sealing means for sealing the joining gap is preferably selected so that it too can become part of the weld seam.

A particularly preferred procedure provides, for example, that the at least one sealing means is formed by a weld seam that is disposed on the surfaces of the parts to be joined so as to bridge the gap, in particular at least on the root side. Such a weld seam can be implemented, for example, by means of arc welding.

If the parts to be joined are disposed with a technical zero gap, the arc welding, for example, can be carried out without filler metal, which is to say the surface can be fused by the action of the arc itself, which seals the zero gap. In the case of an arrangement without technical zero gap, which represents the very advantage of the method, the arc welding can also be carried out while feeding a filler metal. The filler metal can preferably be made of a metal alloy that can subsequently remain in the weld seam, which is generated under the vacuum chamber. In particular, this may be the same filler metal that may be used for introduction under the first vacuum chamber.

As an alternative, for sealing the joining gap on the root side, and possibly also at the end face, the invention can be such that a metal sheet strip or a metal foil is disposed at the run-on and/or run-off on the surfaces of the parts to be joined so as to bridge the gap, and in particular such that the strip or foil is adhesively bonded, soldered, or welded to the surfaces.

Further alternatively, adhesive tape can also be disposed on, in particular glued onto, the surfaces of the parts to be joined so as to bridge the gap. The only prerequisite for the adhesive tape is that this is sufficiently gas-tight. For example, this may be provided by gas-tight lamination of the adhesive tape, for example by metal lamination or plastic film lamination.

As mentioned at the outset, the welding of the parts to be joined can also be carried out under zero gap conditions, using the invention. However, one advantage of the invention is that such a condition is not a prerequisite for the invention.

It may be provided that the parts to be joined bear against one another when welding using a joining gap that does not meet the requirements with regard to a technical zero gap, and in particular that the joining gap is wider than 25 micrometers at least locally, and preferably everywhere along the joining gap. From a practical perspective, such a joining gap also allows the shielding gas to better flow from the first to the second vacuum chamber, when the invention is carried out with a pressure differential between the chambers.

According to the invention, the joining gap can be set to be greater than 25 micrometers, more preferably greater than 100 micrometers, more preferably greater than 1000 micrometers, more preferably greater than 2500 micrometers, and still more preferably greater than 5000 micrometers at least locally, and preferably everywhere along the joining gap.

In all possible embodiments, and in particular in the case of a joining gap greater than a technical zero gap, the invention can provide that the energy beam, preferably a laser, is guided in a swaying/oscillating or circulating manner over the joining gap during welding, which is to say, in particular, repeatedly crossing the joining gap.

The invention can preferably provide that the welding without filler metal is carried out at joining gap widths of less than or equal to 500 micrometers/0.5 mm. With a joining gap greater than 500 micrometers or 0.5 mm, welding is preferably carried out using a filler metal which can be fed by a filler wire.

Regardless of the aforementioned limiting criterion, in a preferred refinement, the invention can provide that a filler wire is fed into the melt pool zone of the energy beam/laser beam and/or into the energy beam/laser beam through a vacuum-tight passage in the wall of the first vacuum chamber. As a result, it is also possible to use the filler metal of the filler wire in the melt zone, using the invention.

For this purpose, the invention can provide that a vacuum-tight passage for a filler wire is disposed in the chamber wall of the first vacuum chamber. Such a passage can, for example, comprise a guide sleeve, by way of which a filler wire can be guided on a line that intersects the axis of the energy beam, and in particular the optical axis of the laser beam, preferably in or beneath the opening plane/surface of the parts to be joined.

The invention can also provide, preferably in the case of electromagnetic energy beams, in particular laser beams, that the energy beam is guided at least regionally in a protective chamber, in particular a protective chamber disposed within the first vacuum chamber, which surrounds the energy beam and through which the shielding gas flows. The electromagnetic energy beam can be coupled into the protective chamber, for example, by way of an optical coupling element, for example a window through which the energy beam can pass, or a transparent lens, and can preferably leave the protective chamber through an opening located opposite the coupling element in the beam direction to the first vacuum chamber. The opening is thus also used for the energy beam to pass through from the protective chamber into the first vacuum chamber, whereupon the energy beam in particular traverses the first vacuum chamber in the direction toward the parts to be joined.

It may be provided that shielding gas introduced into the protective chamber forms a shielding gas flow, which at least partially, possibly completely, crosses through the opening into the first vacuum chamber. For this purpose, a shielding gas inlet is, in particular, disposed closer to the coupling element than to the opening of the protective chamber which is oriented toward the first vacuum chamber.

At least the shielding gas flow passing through the opening preferably at least regionally runs parallel to and in the direction toward the energy beam. It may also be provided that a shielding gas flow is generated in the protective chamber which intersects the energy beam. For this purpose, an outflow nozzle for shielding gas can be disposed, for example, so as to generate a shielding gas jet that intersects the energy beam. Opposite the outflow nozzle, a suction opening can preferably be provided so as to suction at least a portion of the shielding gas directly out of the protective chamber, while another portion of the shielding gas is suctioned out of the first vacuum chamber after having passed through the opening to the first vacuum chamber, and in particular this shielding gas fraction passing through the opening brings about pressure regulation in the first vacuum chamber.

As a result of the shielding gas flow in the protective chamber, the coupling element can be protected against particles that travel out of the first vacuum chamber, in particular from the location of the melt pool in the direction thereof.

The following is a brief description of the drawings:

FIG. 1 is a sectional view showing a use of the invention; and

Figure 1A:
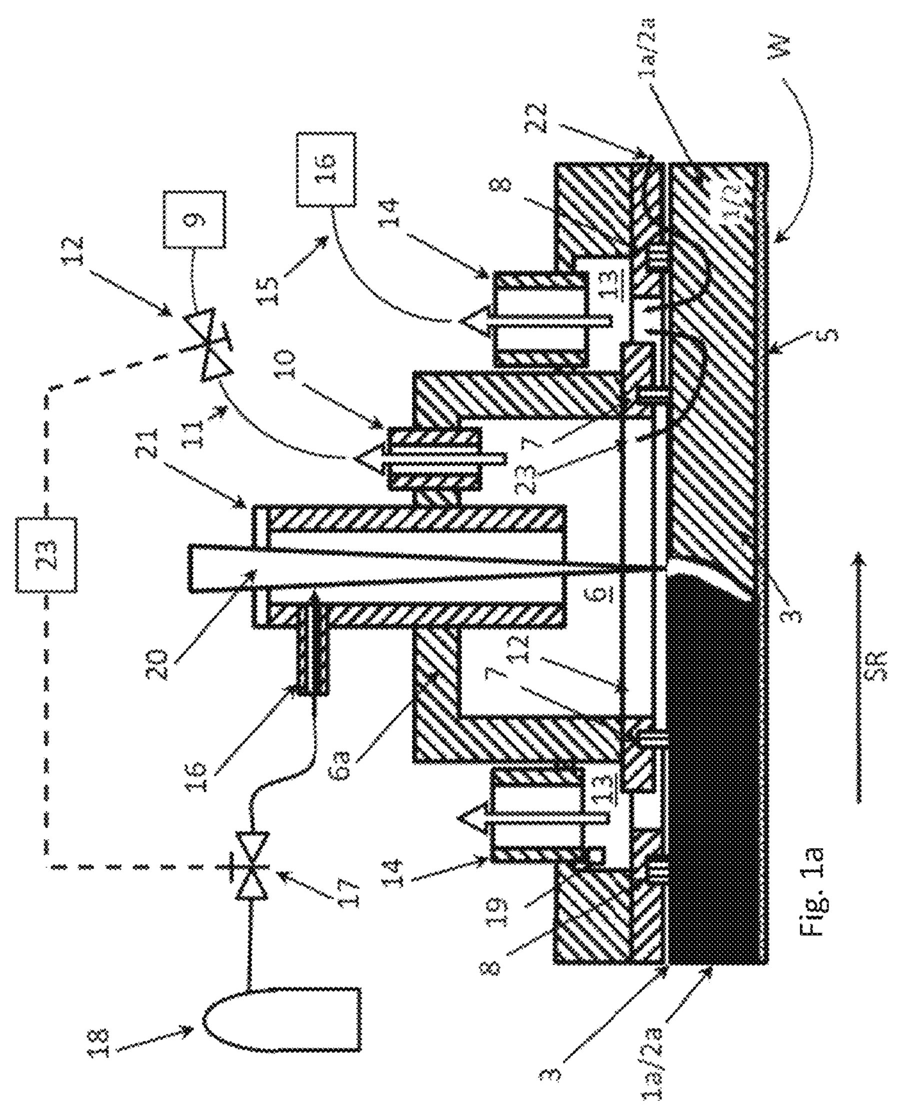

FIG. 1*a* is also a sectional view showing the use of the invention but at a stage in which a region of a sealing gap is already sealed by welding.

Embodiments of the invention will be described hereafter based on the FIGS. 1 and 1*a*.

The figures show the use of the method when welding two planar sheet metal strips as parts to be joined 1 and 2. A joining gap 3 is disposed between these, which is in particular greater than the conditions for a technical zero gap would require. The figures show a sectional view in the vertical plane in which the joining gap 3 is located, which is to say with a view into the joining gap. The welding direction is denoted by the arrow SR.

The joining gap here can preferably have been sealed at least at the root W with respect to the surrounding area.

This is carried out, for example, by way of a sealing means 5 that is applied to the bottom-side/root-side surfaces of the parts to be joined 1 and 2 so as to bridge the gap, for example a weld seam or a gas-tight adhesive tape. A seal can likewise be provided at the run-on-side and/or run-off-side end faces 1*a*, 2*a* and 1 *b*, 2*b*, but is not illustrated here in this detail.

The welding device comprises a first vacuum chamber 6, which is essentially formed by a jar-shaped or bell-shaped chamber wall 6*a*. This is placed in a sealed manner onto the upper-side surface of the parts to be joined 1, 2 so that the first vacuum chamber 6 regionally covers the joining gap 3, which is overall open, on the side to be welded. The annular or frame-shaped chamber edge oriented toward the surface of the parts to be joined 1, 2 comprises a seal 7 here, so that gas can only flow into or out of the first vacuum chamber 6 through the joining gap 3. The first vacuum chamber 6 is evacuated by way of a schematically illustrated pump 9 through the vacuum connection 10 via the line 11 and the valve 12, so that a first pressure level is established in the first vacuum chamber 6.

The welding device comprises a further, second vacuum chamber 13, which, preceding at least in the welding direction SR, directly adjoins the chamber wall 6*a* of the first vacuum chamber 6 and, here in particular surrounds the first vacuum chamber 6 in an annular manner. The second vacuum chamber 13 has a shared, here in particular annular, chamber wall 6*a* with the first vacuum chamber 6. The second vacuum chamber 13 rests with the annular chamber walls thereof on the surface of the parts to be joined 1, 2 by way of the seals 7 and 8.

Generally speaking, the end faces of the chamber walls of the first and second vacuum chambers which point toward the surfaces of the parts to be joined rest on the surfaces of the parts to be joined in a sealed manner by way of sealing elements in all possible embodiments, including those not shown here.

By pumping the air out of the second vacuum chamber 13 through the vacuum connection 14 via the line 15 using the pump 16, a second pressure level is achieved in the second vacuum chamber 13. According to the invention, this second pressure level is lower than the first pressure level in the first vacuum chamber 6 or is exactly equal thereto.

This is achieved by regulating the pressure level in the first vacuum chamber 6, namely by varying the pump-out cross-section in the line 11 by adjusting the valve 12 and/or by varying the volume of flow of shielding gas, by way of a valve 17 or pressure reducer 17, from a gas reservoir 18, which flows via the shielding gas connection 16 into the first vacuum chamber 6. A regulation unit 23 can control the valves 12, 17, for example as a function of the measured pressure in the second vacuum chamber 13.

The second pressure level can be unregulated or also be regulated.

For regulating the first pressure level, the actual pressure in the second vacuum chamber 13 can be detected by way of a pressure sensor 19 and the target value for regulating the first pressure level may be found therefrom.

By virtue of the invention, no gas flow whatsoever is present in the joining gap 3 in a first possible embodiment when equal pressure is set in the two vacuum chambers 6, 13, even though an air flow 22 from the surrounding area enters the second vacuum chamber 13.

In a second embodiment, when a pressure differential is set between the vacuum chambers 6, 13, due to the higher pressure level in the first vacuum chamber 6, shielding gas can flow from the first vacuum chamber 6 via the joining gap 3, in a shielding gas flow 23, into the second vacuum chamber 13, in the still unwelded region, with ambient air only reaching the second vacuum chamber 13 in the air flow 22.

In both instances, ambient air is thus prevented from reaching the welding zone within the first vacuum chamber 6, which is produced by a laser beam 20, which enters the first vacuum chamber 6 through an inlet window 21 and illuminates the parts to be joined 1, 2 in the joining gap region on the side to be welded.

The figures also show an embodiment in which the laser beam 20 is surrounded in the beam direction by a tube, which forms a protective chamber. On the beam entry side, the tube is provided with the aforementioned inlet window 21, through which the laser beam 20 passes. On the beam exit side, the tube opens via an opening into the first vacuum chamber 6, is thus connected thereto in terms of flow, and is thus also part of the first vacuum chamber 6.

The shielding gas inlet into the tube/into the protective chamber is provided closer to the inlet window 21 than to the opening, resulting in a directed shielding gas flow, which results in the beam direction of the laser beam 20 and parallel thereto through the tube. Particles that travel from the melt pool in the direction of the inlet window thus cannot contaminate the same, since these are prevented from reaching the inlet window by the shielding gas flow.

FIG. 1*a* only differs from FIG. 1 in that the situation for an ongoing welding progress is shown, in which the region of the joining gap 3 situated downstream from the laser beam 20, with respect to the welding direction, is already sealed by welding.

As a result, gas can only flow between the two vacuum chambers 6 and 13 in the region of the joining gap 3 that is located in front of the laser beam 20. Also, for this reason, it is possible to dispose a second vacuum chamber only in the welding direction ahead of the first vacuum chamber, at least when the welding process is started on a run-on plate, so that the start of the joining gap is located beneath the first vacuum chamber and upstream of the laser beam 20, in the welding direction SR.

The invention claimed is:

1. A method for welding together two parts to be joined along a joining gap disposed therebetween, comprising illuminating the joining gap with an energy beam over an entire depth of the joining gap through a mobile vacuum chamber in which a vacuum is generated and which is moved on the parts to be joined, on the side to be welded, along the joining gap, wherein:

a. the vacuum chamber, through which the energy beam is transmitted, forms a first vacuum chamber, in which, during welding, a vacuum having a first pressure level is generated; and b. a vacuum having a second pressure level is generated in a second vacuum chamber which adjoins the first vacuum chamber directly at a chamber wall thereof and surrounds at least a region of the first vacuum chamber and which, during welding, covers a region of the joining gap, c. the pressure levels in the two vacuum chambers being matched to one another or the first pressure level being raised to greater than the second pressure level by way of a pressure regulating system.

2. The method according to claim 1, wherein a difference between the pressure levels is maintained within a range of 1 to 30 mbar.

3. The method according to claim 1, wherein the first pressure level is changed for setting the pressure levels with respect to one another by changing a volume of flow of a shielding gas fed into the first vacuum chamber and/or by changing a volume of flow of gas pumped out of the first vacuum chamber by means of at least one adjustable valve without changing a pump line by which the second vacuum chamber is evacuated.

4. The method according to claim 1, wherein power of the energy beam is changed as a function of the first and/or second pressure levels.

5. The method according to claim 1, wherein the joining gap at a root-side surface of the parts to be joined is sealed prior to starting to weld the parts to be joined together.

6. The method according to claim 1, wherein, prior to starting to weld the parts to be joined together, the joining gap is sealed in all surface regions of the parts to be joined in which the joining gap is open to a surrounding area, excerpt surface regions on the side to be welded.

7. The method according to claim 5, wherein, for sealing the joining gap, at least one sealing means that bridges the joining gap is applied onto the root-side surface of the parts to be joined and, if present, also onto a run-on-side and/or run-off-side surface of the parts to be joined, the root-side surface being sealed first.

8. The method according to claim 7, wherein applying the at least one sealing means comprising:

a. forming at least one weld seam on the surfaces of the parts to be joined by arc welding while feeding a filler metal so as to bridge the gap, and/or b. adhesively bonding, soldering or welding a metal sheet strip or a metal foil onto the surfaces of the parts to be joined so as to bridge the gap, and/or c. gluing an adhesive tape onto the surfaces of the parts to be joined so as to bridge the gap.

9. The method according to claim 1, wherein the joining gap between the parts to be joined is formed by placing the parts to be joined against one another in an 1-butt joint configuration, a distance between the opposing parts to be joined being outside the tolerances of a technical zero gap, edges and end faces of the parts to be joined having cutting roughness.

10. The method according to claim 1, wherein the parts to be joined have a thickness greater than 10 mm, and the welding of the two parts to be joined is effected in a single welding operation.

* * * * *